(12) United States Patent
Hoshino et al.

(10) Patent No.: US 9,657,176 B2
(45) Date of Patent: May 23, 2017

(54) C.I. PIGMENT YELLOW 74 (INSOLUBLE AZO PIGMENT), AND COLORING COMPOSITION USING SAME

(71) Applicant: DAINICHISEIKA COLOR & CHEMICALS MFG. CO., LTD., Tokyo (JP)

(72) Inventors: Ryo Hoshino, Tokyo (JP); Shigeyuki Nagasato, Tokyo (JP); Masahiro Takayama, Tokyo (JP); Shigeru Inoue, Tokyo (JP); Satoru Matsuzaki, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 0 days.

(21) Appl. No.: 14/363,180

(22) PCT Filed: Dec. 19, 2012

(86) PCT No.: PCT/JP2012/082899
§ 371 (c)(1),
(2) Date: Jun. 5, 2014

(87) PCT Pub. No.: WO2013/099730
PCT Pub. Date: Jul. 4, 2013

(65) Prior Publication Data
US 2014/0335358 A1    Nov. 13, 2014

(30) Foreign Application Priority Data

Dec. 28, 2011 (JP) ................................ 2011-288579

(51) Int. Cl.
*C09B 51/00* (2006.01)
*G03G 9/09* (2006.01)
(Continued)

(52) U.S. Cl.
CPC .......... *C09B 51/00* (2013.01); *C09B 67/0022* (2013.01); *C09B 67/0029* (2013.01);
(Continued)

(58) Field of Classification Search
USPC ........................................................ 428/32.37
See application file for complete search history.

(56) References Cited

FOREIGN PATENT DOCUMENTS

| EP | 0492529 | 7/1992 |
|----|---------|--------|
| JP | 2002-138233 | 5/2002 |

(Continued)

OTHER PUBLICATIONS

JP 2002-138233, Ink Composition and Recording Apparatus Using the Same, Satoshi Nishigaki, English Machine Translation.*
(Continued)

*Primary Examiner* — Humera Sheikh
*Assistant Examiner* — Elaine M Vazquez
(74) *Attorney, Agent, or Firm* — Hamre, Schumann, Mueller & Larson, P.C.

(57) ABSTRACT

A C.I. Pigment Yellow 74 as an insoluble azo pigment is provided. This C.I. Pigment Yellow 74 is crystalline particles. The ratio (26.6°/11.7°) of a diffraction intensity of a peak at 26.6° to a diffraction intensity of a peak at 11.7° in terms of Bragg angle (2θ±0.2°) as measured by powder X-ray diffraction using CuK α-radiation is 0.85 to 1.12, and the average primary particle size is 20 to 130 nm. The use of this C.I. Pigment Yellow 74 as a colorant in a coloring composition enables to provide the coloring composition with excellent dispersibility and good particle size stability and storage stability compared with conventional pigments. The use of this coloring composition enables the formation (recording) of images having excellent clarity and transparency of such high levels that have not been achievable by conventional technologies.

4 Claims, 4 Drawing Sheets

(51) Int. Cl.
*C09B 67/00* (2006.01)
*C09D 7/00* (2006.01)
*C09D 11/322* (2014.01)
*C09B 67/48* (2006.01)

(52) U.S. Cl.
CPC ............ *C09D 7/007* (2013.01); *C09D 11/322* (2013.01); *G03G 9/091* (2013.01); *Y10T 428/2982* (2015.01)

(56) References Cited

FOREIGN PATENT DOCUMENTS

| JP | 2003-012960 | 1/2003 |
|----|-------------|--------|
| JP | 2003-012968 | 1/2003 |
| JP | 4190218 B   | 12/2008 |

OTHER PUBLICATIONS

JP 2004-026930, Insoluble Azo Pigment and Colored Composition, Hisao Okamoto et al., English Machine Translation.*
Lomax, Suzanne Quillen, "The application of x-ray powder diffraction for the analysis of synthetic organic pigments. Part 1: dry pigments.", J. Coat. Technol. Res., 7 (3) 331-346, 2010.*
Extended European Search Report, Jul. 13, 2015; European Patent Application No. 12863374.0 (6 pages).

* cited by examiner

Fig.7

C.I. PIGMENT YELLOW 74 (INSOLUBLE AZO PIGMENT), AND COLORING COMPOSITION USING SAME

TECHNICAL FIELD

This invention relates to a C.I. Pigment Yellow 74 as an insoluble azo pigment excellent in weather (light) resistance or the like, and also to a coloring composition using the same.

BACKGROUND ART

As one of performance requirements for an inkjet recording ink (inkjet ink), the formability of an image excellent in transparency, clarity and the like can be mentioned, for example. In inks for use in office-automation inkjet printers, dyes capable of forming images excellent in transparency, clarity and the like have, therefore, been used as colorants conventionally. Inkjet inks have, however, been finding utility to obtain prints to be posted outdoors, such as posters for outdoor display and prints for building materials, because of the popularization of diverse inkjet printers in recent years. Nonetheless, images recorded with dye inks, which contain dyes as colorants, involve a problem that they are prone especially to color fading or color skipping when posted outdoors. From these circumstances, there is also an increasing demand for pigment inks, in which pigments excellent in weather (light) resistance are incorporated as colorants, in inkjet recording.

As colorants for inkjet inks, yellow, magenta, cyan and like pigments such as those to be described below are used. Among such magenta pigments and cyan pigments, medium- to high-grade pigments excellent in weather (light) resistance, such as quinacridone-based pigments and phthalocyanine-based pigments, are primarily used. Among such yellow pigments, on the other hand, C.I. Pigment Yellow 74, an insoluble azo yellow pigment, is mainly used from the aspect of production cost, production easiness, transparency and clarity, and the like. However, C.I. Pigment Yellow 74 as an azo pigment is accompanied by a problem that its weather (light) resistance is insufficient compared with the medium- and high-grade pigments used as the magenta pigments and cyan pigments.

The above-described C.I. Pigment Yellow 74 can be synthesized, for example, by a coupling reaction that a diazonium salt, which has been obtained by diazotizing an aromatic amine compound, and a coupling component are reacted. As another illustrative synthesis method of C.I. Pigment Yellow 74, an accessory-assisted coupling method is known. According to this accessory-assisted coupling method, similar to conventionally-known synthesis methods of azo pigments, a component which is similar in structure to a main raw material [an aromatic amine compound (diazonium salt) or coupling component] is added as an accessory to a solution of the diazonium salt or a grounding solution at the time of a coupling reaction, and is reacted. As a further known method, heat treatment is conducted after a coupling reaction to induce crystal growth such that pigment particles are provided with enhanced fastness. It is, however, the current situation that, whichever method is used, no C.I. Pigment Yellow 74 has been obtained yet with performance sufficient to satisfy the various performance required for a pigment for use in inkjet inks.

The present applicant has already proposed, as a technology on C.I. Pigment Yellow 74, a C.I. Pigment Yellow 74 in which the average particle size is 30 to 150 nm, the half-value width of a maximum peak or a similar peak in an X-ray diffraction spectrum is 0.3 to 0.7°, and the (average value) of the ratios of major axes to minor axes of particles is 1 to 1.5 (see Patent Document 1). This C.I. Pigment Yellow 74 is excellent in light resistance, and enables the recording of images having good transparency and clarity.

PRIOR ART DOCUMENT

Patent Document

Patent Document 1: JP-B-4190218

DISCLOSURE OF THE INVENTION

Problem to be Solved by the Invention

According to a study by the present inventors, however, even the use of an ink, which contains the C.I. Pigment Yellow 74 described in Patent Document 1, in an attempt to meet the ever-heightening performance requirements for various prints in recent years is not considered to provide recorded images with very good clarity and transparency, and especially with respect to prints to be posted outdoors, there is still room for further improvements in their weather (light) resistance. According to another study by the present inventors, coloring compositions with the above-described conventional C.I. Pigment Yellow 74 contained therein also leave room for improvements in their particle size stability and storage stability. The term "particle size stability and storage stability" as used herein means that, even when a dispersion of a coloring composition is subjected to an accelerated heat test, not many changes occur in viscosity and particle size.

With such problems of the conventional technology in view, the present invention has as an object thereof the provision of a C.I. Pigment Yellow 74, which as an insoluble azo pigment having excellent weather (light) resistance, is excellent in dispersibility compared with the conventional pigment when used as a colorant in a coloring composition and enables to provide the coloring composition with good particle size stability and storage stability, and which by using the colon composition, also enables to form (record) images having excellent clarity and transparency of such high levels that have not been achievable by the conventional technology.

Means for Solving the Problem

As a result of enthusiastic research conducted to achieve the above-described object, the present inventors found that the above-described problems of the conventional technology can be resolved when in a pigmented C.I. Pigment Yellow 74, the ratio (26.6°/11.7°) diffraction intensity of a peak at 26.6° to a peak at 11.7° among peaks measured by powder X-ray diffraction using CuK α-radiation falls within a specific range and the average primary particle size also falls within a particular range. This finding has led to the completion of the present invention.

Described specifically, the present invention provides the following C.I. Pigment Yellow 74 series as insoluble azo pigments.

[1] A C.I. Pigment Yellow 74 as an insoluble azo pigment, wherein the C.I. Pigment Yellow 74 is crystalline particles having a ratio (26.6°/11.7°) of a diffraction intensity of a peak at 26.6° to a diffraction intensity of a peak at 11.7° in terms of Bragg angle (2θ±0.2°) in a range of 0.85 to 1.12 as measured by powder X-ray diffraction using CuK α-radiation, and also having an average primary particle size of 20 to 130 nm.

[2] The C.I. Pigment Yellow 74 as described above in [1], wherein a half-value width of the peak at 11.7° and a half-value width of the peak at 26.6° are both in a range of 0.10 to 0.60°.

[3] The C.I. Pigment Yellow 74 as described above in [1] or [2], wherein an average value of ratios (major axes/minor axes) of major axes to minor axes of the crystalline particles is 1 to 1.50.

The present invention also provides, as other embodiments, the following coloring compositions.

[4] A coloring composition comprising, as a colorant, the C.I. Pigment Yellow 74 as described above in any one of [1] to [3].

[5] The coloring composition as described above in [4], which is an image recording composition or an inkjet recording composition.

Advantageous Effects of the Invention

According to the present invention, there is provided, as an insoluble azo pigment, a C.I. Pigment Yellow 74 which, when used as a colorant in a coloring composition, is evidently excellent in dispersibility, is good in particle size stability and provides the coloring composition with good stability, all compared with the C.I. Pigment Yellow 74 provided as an insoluble azo pigment by the conventional technology. Further, the use of a coloring composition, which contains the above-described excellent C.I. Pigment Yellow 74 provided by the present invention, enables to form (record) images having excellent clarity and transparency of such high levels that have not been achievable by the conventional technology.

MODES FOR CARRYING OUT THE INVENTION

C.I. Pigment Yellow 74 (Insoluble Azo Pigment)

To resolve the above-described problems of the conventional technology, the present inventors changed the conditions for the pigmentation of the C.I. Pigment Yellow 74 (which may hereinafter be referred to as "the P.Y.74") in various ways, measured the P.Y. 74 pigments pigmented under the respective conditions (which may hereinafter be called "the P.Y. 74 pigments") for their crystallinity, and conducted a detailed study on the measurement values of crystallinity and differences in properties when the resultant pigments were used as colorants in coloring compositions. This detailed study has led to the completion of the present invention. Described specifically, compared with the coloring compositions making use of the conventional P.Y. 74 pigments, the P.Y. 74 pigment according to the present invention exhibits still better particle size stability and storage stability when it is used as a colorant in a coloring composition. In addition, the use of the P.Y. 74 pigment according to the present invention enables to form (record) images having excellent clarity and transparency of such high levels that have not been achievable with the conventional P.Y. 74 pigments. Moreover, the thus-obtained prints are provided with still better weather (light) resistance so that they undergo less color changes when posted outdoors. According to a still further study by the present inventors, the above-described excellent effects can be stably obtained when pigmented P.Y. 74 meets the below-described requirements. Described specifically, the P.Y. 74 pigment according to the present invention is required to be crystalline particles, which have crystallinity that the ratio (26.6°/11.7°) of a diffraction intensity of a peak at 26.6° to a diffraction intensity of a peak at 11.7° in terms of Bragg angle (2θ±0.2°) as measured by powder X-ray diffraction using CuK α-radiation falls within a range of 0.85 to 1.12, and which also have an average primary particle size of 20 to 130 nm. The present invention will hereinafter be described more specifically based on preferred embodiments.

As described above, the excellent effects of the present invention rely specifically on the crystallinity of the pigmented P.Y. 74, and are stably available when the P.Y. 74 pigment is specific crystalline particles specified in the present invention. Described specifically, the P.Y. 74 pigment according to the present invention is required to be crystalline particles having the crystallinity that the ratio (26.6°/11.7°) of the diffraction intensity of peak at 26.6° to the diffraction. intensity of the peak at 11.7° in terms of Bragg angle (2θ±0.2°) as measured by powder X-ray diffraction using CuK α-radiation is 0.85 to 1.12. The ratio may be preferably in a range of 0.87 to 1.10, more preferably in a range of 0.89 to 1.00. According to a still further study by the present inventors, when the P.Y. 74 pigment is crystalline particles that the ratio of the diffraction intensity of a peak at 26.6° to the diffraction intensity of a peak at 11.7° (which may hereinafter be referred to simply as "the diffraction intensity ratio") falls within the above-described numerical range, its use as a colorant provides the resulting images with substantial improved weather (light) resistance. Further, this P.Y. 74 pigment is also excellent in dispersibility, and its incorporation as a colorant in a coloring composition provides the coloring composition with good particle size stability and storage stability, and moreover, the coloring composition can form (record) images having excellent clarity and transparency.

No elucidation has been made yet of the mechanism through which such effects as described above can be obtained when the above-described diffraction intensity ratio of the P.Y. 74 pigment falls within the above-described specific range. However, a correlation is presumed to exist between the diffraction intensity ratio specified in the present invention and the shape of particles of the P.Y. 74, and is considered to be a cause of the occurrence of the above-described excellent effects. Described specifically, the P.Y. 74 pigment the above-described diffraction intensity ratio of which falls within the above-described numerical range is crystalline particles the shapes of which are closer to spherical, so that the P.Y. 74 pigment is equipped with improved dispersibility in a dispersion medium and has made it possible to prepare a coloring composition having good particle size stability and storage stability. In addition, when the diffraction intensity ratio defined in the present invention falls within the above-described numerical range, the crystalline particles of the P.Y. 74 are considered to be equipped with improved crystallinity, and hence, to provide the resulting images with improved weather (light) resistance.

The powder X-ray diffraction of the P.Y. 74 pigment can be measured, for example, using a powder X-ray diffractometer ("RINT 2000", trade name, manufactured by Rigaku Corporation) and following Japanese industrial Standards (JIS) K0131 (General Rules for X-ray Diffractometric Analysis).

The P.Y. 74 pigment according to the present invention may preferably be crystalline particles that the half-value width of the peak at 11.7° and the half-value width of the peak at 26.6" in terms of Bragg angle ($2\theta \pm 0.2°$) as measured by powder X-ray diffraction using CuK $\alpha$-radiation are both in a range of 0.10 to 0.60°, with a range of 0.10 to 0.58° being more preferred. Particularly preferably, these half-value widths may fall within a range of 0.10 to 0.56°. It is to be noted that the term "half-value width of a peak" means the peak width (angle) at half height of the corresponding peak (X-ray diffraction intensity) from a baseline in a powder X-ray diffraction spectrum. According to a still further study by the present inventors, the P.Y. 74 pigment that the half-value width of the peak at 11.7° and the half-value width of the peak at 26.6° both falls within the above-described numerical range is very high in crystallinity. The P.Y. 74 of such high crystallinity, therefore, exhibits still better weather (light) resistance although. its average primary particle size is very small as will be described below.

The P.Y. 74 pigment according to the present invention is required to be pigment particles (crystalline particles) having an average primary particle size of 20 to 130 nm and the above-mentioned specific crystallinity. The particle size may be preferably 50 to 120 nm, more preferably 70 to 110 nm. According to a yet further study by the present inventors, when the average primary particle size of pigment particles of P.Y. 74 falls within the above-described range, its use as a colorant can obtain a coloring composition (ink) that can record images of still better transparency and clarity. If the average primary particle size of the P.Y. 74 pigment is greater than 130 nm, it is impossible to obtain a coloring composition (ink) that can record images of still better transparency and clarity. If the average primary particle size of the P.Y. 74 pigment is smaller than 20 nm, on the other hand, the pigment itself undergoes stronger aggregation so that its dispersibility is impaired.

The average primary particle size of the P.Y. 74 pigment according to the present invention can be measured and calculated, for example, as the average value of the particle sizes of primary particles of the pigment chosen as many as 10 or so at will by photographing pigment particles with a transmission electron microscope ("H7100", trade name, manufactured. by Hitachi, Ltd.).

The shapes of the crystalline particles of the P.Y. 74 pigment according to the present invention may preferably be oval or truly spherical rather than acicular. Preferably, the crystalline particles of the P.Y. 74 may preferably be even and uniform in particle form. As the more specific shapes of the crystalline particles of the P.Y. 74, the average of the ratios (major axes/minor axes) of major axes to minor axes may be preferably 1 to 1.50, more preferably 1 to 1.30. According to a yet further study by the present inventors, the control of the average of the ratios (major axes/minor axes) of major axes to minor axes of the crystalline particles of the P.Y. 74 to the above-described numerical range can further improve the dispersibility in a dispersion medium when it is used in a coloring composition.

The average of the ratios (major axes/minor axes) of major axes to minor axes of the crystalline particles of the P.Y. 74 can be measured in a similar manner as in the above-described measurement of the average primary particle size. Described specifically, the pigment particles are photographed, for example, with the transmission electron microscope ("H7100", trade name, manufactured by Hitachi, Ltd.). Then, the minor axes and major axes of the primary particles of the pigment are measured, and the ratios (major axes/minor axes) of the major axes to the minor axes are calculated. The average of the "major axes/minor axes" as calculated based on the primary particles of the pigment as chosen as many as 10 or so at will can he used as the average of the ratios (major axes/minor axes) of the major axes to the minor axes of the P.Y. 74 .

As a method for producing the P.Y. 74 according to the present invention, said P.Y. 74 having been subjected to pigmentation and being pigment particles (crystalline particles) having the particular crystallinity and average particle size specified in the present invention, it is possible to mention, for example, a method that subjects particles of the conventionally-known P.Y. 74 before pigmentation processing (which will hereinafter be referred to as "the unprocessed pigment" for the sake of convenience) to pigmentation by wet milling or a like technique. As the method for producing the P.Y. 74 according to the present invention, it is also a preferred mode to mechanically grind the unprocessed dry-form pigment and then to subject the resulting ground pigment to wet milling. The wet milling of the unprocessed pigment can be conducted, for example, according to a conventionally-known technique.

As an apparatus useful upon conducting the above-described wet milling, illustrative are those relying upon collision grinding, such as a ball mill, sand mill, attritor and vibration mill; and those performing grinding under shear force, such as a horizontal continuous medium disperser, kneader, three-roll mill and Banbury mixer. Wet grinding may also be conducted using a dispersion medium. Specific examples of the dispersion medium include glass beads, steel balls, zirconia balls, titania balls, alumina balls, steel rods, and the like. A milling aid such as common salt, anhydrous sodium sulfate or aluminum sulfate can also be used as needed.

During the above-described wet milling upon preparation of the P.Y. 74 pigment according to the present invention, one or more of conventionally-known additives can be used as needed. For example, it is also a preferred method to conduct wet milling by mixing, in addition to a rosin such as hydrogenated rosin as a dispersant, a high-molecular dispersant such as a surfactant, a pigment derivative, an extender pigment and the like either singly or in combination. In view of the dispersibility of the pigment, one or more of such conventionally-known additives can be used in the above-described manner in its preparation such that its aggregation, adhesion and the like can also be effectively suppressed. Additives usable in the above-described method include those to be described hereinafter. As the surfactant, preferably usable examples include nonionic surfactants, e.g., polyoxyalkylene alkyl ethers such as polyoxyethylene lauryl ether and polyoxyethylene stearyl ether, polyoxyalkylene alkylphenyl ethers, polyoxyalkylene alkyl amino ethers, sorbitan fatty acid esters and glycerin fatty acid esters; anionic surfactants, e.g., sulfonate salts such as sodium polyoxyethylene lauryl ether sulfates and sodium lauryl sulfate, and phosphate esters such as potassium alkyl phosphates; cationic surfactants led by quaternary ammonium salts such as lauryl trimethylammonium chloride and stearyl trimethylammonium chloride; and the like.

Examples of the pigment derivative usable upon preparation of the P.Y. 74 pigment according to the present invention include those obtained by substituting pigments, such as anthraquinone, quinacridone, phthalocyanine and perylene, with one or more alkyl groups, sulfonic acid groups, sulfonamide groups, metal sulfate groups, halogen groups, phthalimide groups or the like. Further, usable extender pigments include silica, talc, calcium carbonate, barium sulfate, titanium oxide, and the like. These additives are not specifically limited, but can be suitably used according to the purpose.

Upon preparation of the P.Y. 74 pigment according to the present invention, a solvent is used when the unprocessed pigment is subjected to wet milling. Preferred as this solvent is a water-soluble organic solvent that promotes the crystal growth of the pigment to an adequate extent. Specific examples of the water-soluble organic solvent, which has such an effect, include diethylene glycol, ethylene glycol monobutyl ether, triethylene glycol monobutyl ether, propylene glycol, polyethylene glycol (#200, #300 and so on), glycerin, formamide, and the like. With a solvent (for example, N-methyl-2-pyrrolidone or the like) that enhances the crystal growth of the pigment, the crystal growth is promoted superseding the effects of wet milling, thereby possibly making it difficult to obtain the pigment with a particular diffraction intensity ratio controlled as specified in the present invention. Such a solvent is not preferred accordingly. The wet milling of the unprocessed pigment may be conducted preferably under warming or heating conditions. The wet milling under warming or heating conditions can readily prepare crystalline particles of the P.Y. 74 pigment, which can meet the diffraction intensity ratio and average primary particle size specified the present invention. The wet milling may be conducted while controlling such that the temperature of the object (the unprocessed pigment) under processing remains preferably at 50 to 100° C., more preferably at 60 to 95° C. The time required for the wet milling may be, but is not specifically limited to, 3 to 24 hours or so in general.

As the unprocessed pigment needed for obtaining the P.Y. 74 pigment of the present invention through such pigmentation processing as described above, either a commercial product or a synthesized pigment may be used. The unprocessed pigment can be synthesized, for example, by the conventionally-known azo synthesis process described in JP-B-60-36224, JP-B-3055673 or the like. For preventing the resulting particles of the unprocessed pigment from aggregation, it is preferred to conduct this synthesis by using, in combination, such a known rosin, high-molecular dispersant, surfactant, polar group-introduced pigment derivative or the like as mentioned above. Furthermore, the resulting crystals of the unprocessed pigment may preferably be allowed to grow by making combined use of the accessory-assisted coupling method, a method that involves heat treatment, or a method that adds a water-soluble organic solvent or a hydrophobic organic solvent upon heat treatment, as needed.

Coloring Composition

The coloring composition of the present invention contains as a colorant the above-mentioned crystal line particles of the P.Y. 74 according to the present invention. Usable examples of the coloring composition according to the present invention include image recording compositions such as various printing inks, sizing colors, binder colors, coating formulations, various paints, and dry or wet toners for electronic copying machines; thermal transfer recording inks; inks for writing utensils; inkjet inks; and the like. Among these, the coloring composition according to the present invention is particularly useful as image recording compositions (toners) and inkjet inks in which excellent particle size stability and storage stability, the ability of forming (recording) images of excellent weather (light) resistance, clarity and transparency, and the like are required at high levels.

In the coloring composition according to the present invention, it is possible to use, as components other than P.Y. 74 contained as a colorant, those commonly contained in coloring compositions led by inkjet inks. As components other than the P.Y. 74 pigment, which are used upon preparation of an inkjet ink, illustrative are water, a water-soluble resin, a surfactant, a water-soluble solvent, and so on.

Specific examples of. the water-soluble resin used as described. above include acrylic resins, acrylic-styrene resins, polyester resins, polyamide resins, polyurethane resins, and the like. Specific examples of the surfactant include anionic surfactants, nonionic surfactants, amphoteric surfactants, cationic surfactants, and the like. Further, specific examples of the water-soluble solvent include alcohols such as methanol, ethanol and isopropyl alcohol; polyhydric alcohols such as ethylene glycol, diethylene glycol, polyethylene glycol and glycerin; polyhydric alcohol ethers such as ethylene glycol monomethyl ether and ethylene glycol monobutyl ether; amine-based solvents such as diethanolamine and ethanolamine; heterocyclic compound-based solvents such as N-methylpyrrolidone; sulfoxide-based solvents; sulfone-based solvents; acetonitrile; and the like.

When the coloring composition according to the present invention is an image-recording composition (toner), a binder resin is generally contained as a component other than the P.Y. 74pigment to bond particles of P.Y. 74 pigment together. Specific examples of such a resin include polystyrene, styrene-(meth) acrylate ester copolymers, styrene-butadiene copolymer, polyesters, epoxy resins, and the like.

When the coloring composition according to the present invention is one that the P.Y. 74 pigment is dispersed as a colorant in a dispersion medium, dispersion media suitable for its application can each be used as the dispersion medium. The content of the P.Y. 74 pigment in the coloring composition may generally be 1 to 60 mass % or so based on the entirety of the coloring composition although it differs depending on the application.

In the coloring composition according to the present invention, one or more of components such as surface tension modifiers, viscosity modifiers, specific resistance modifiers, defoaming agents and antimolds may be added as desired to provide the coloring composition with improved physical properties such as storability and ejection stability. The coloring composition according to the present invention can be produced, for example, by mixing the P.Y. 74 pigment of the present invention as an essential component with various components other than the essential component and then highly dispersing them by a conventional method.

EXAMPLES

The present invention will hereinafter be specifically described based on examples, but the present invention shall not be limited to these examples. It is to be rioted that all designations of "parts" and "%" in the examples and in comparative examples are on a mass basis unless otherwise specifically indicated.

(1) Synthesis of Unprocessed Pigment

Synthesis Example

Using 2-methoxy-4-nitroanline (910 parts) and 2-methoxyacetoacetanilide (1,220 parts), they were subjected to an accessory-assisted coupling reaction by a conventionally-known method. After aging treatment was conducted under heating, the reaction product was washed with water and dried to obtain the unprocessed pigment (2-[(2-methoxy-4-nitrophenyl)azo]-N-(2-methoxypheny 1)-3-oxobutanamide) (2,100 parts).

Figure 1:
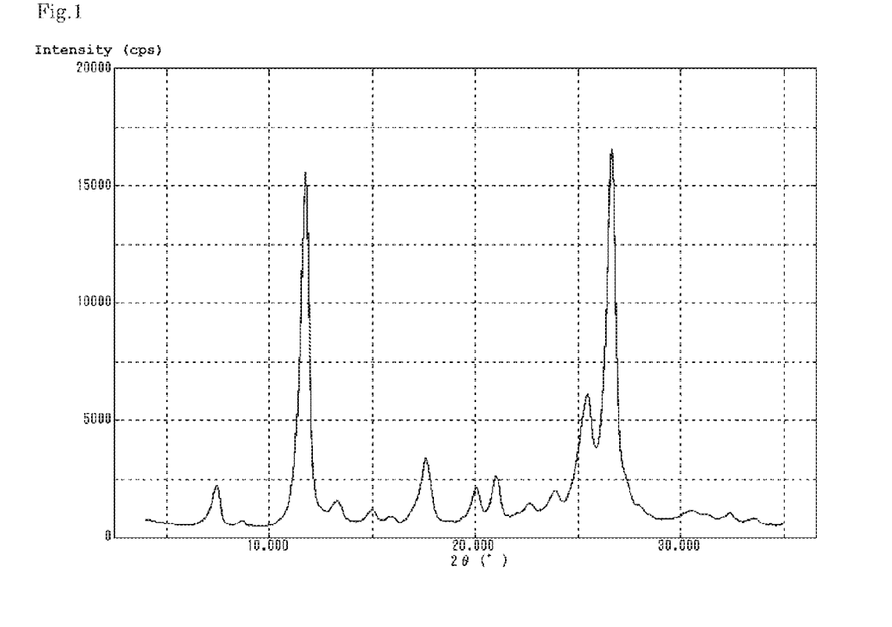
FIG. 1 is a graph showing the measurement results of powder X-ray diffraction of an unprocessed pigment prepared in a synthesis example.

The unprocessed pigment obtained as described above was subjected as a measurement sample to powder X-ray diffraction by using the powder X-ray diffractometer ("RINT 2000", trade name, manufactured by Rigaku Corporation), and the measurement results are shown in FIG. 1. Concerning the unprocessed pigment obtained as described above, the ratio (26.6°/11.7°) of the diffraction intensity of a peak at 26.6° to the diffraction intensity of a peak at 11.7° in terms of Bragg angle (2θ±0.2°) as measured by powder X-ray diffraction was 1.20. Further, the half-value width of the peak at 11.7° was 0.45°, and the half-value width f the peak at 26.6° was 0.53°. Furthermore, the unprocessed pigment (particle) were photographed under a photographing condition of 60,000 magnification with the transmission electron microscope ("H7100", trade name, manufactured by Hitachi, Ltd.). The thus-photographed pigment particles were measured by visual observation. As a result, the average primary particle size of the unprocessed pigment (particles) obtained as described above was found to be 160 nm. In addition, the shapes of the unprocessed pigment (particles) were acicular, and the average of the ratios (major axes/minor axes) of their major axes to minor axes was 2.03. it is to be noted that the above-described powder X-ray diffractometer was also used in X-ray diffraction in other examples and comparative examples. Each ratio (26.6°/11.7°) in diffraction intensity of peaks measured in a similar manner as described above will hereinafter be described simply as "the (26.6°/11.7°) diffraction intensity ratio".

(2) Preparation of Pigments

Example 1

The unprocessed pigment (400 parts) prepared in the synthesis example, sodium chloride (2,400 parts) and propylene glycol (700 parts) were charged in a kneader, and the contents were kneaded into an evenly moistened mass. While maintaining the temperature of the mass at 60 to 90° C. by controlling a cooling system and a heating medium system, the mass was kneaded and milled for 6 hours to obtain a milled mixture. To the milled mixture taken out of the kneader, water (40,000 parts) was added, and the resulting mixture was allowed to stand overnight. After the mixture was heated to 60° C., filtration and water washing were conducted to remove sodium chloride and propylene glycol. Subsequently, drying was conducted at 100° C. for 24 hours, followed by grinding to obtain Pigment A (385 parts).

Figure 2:
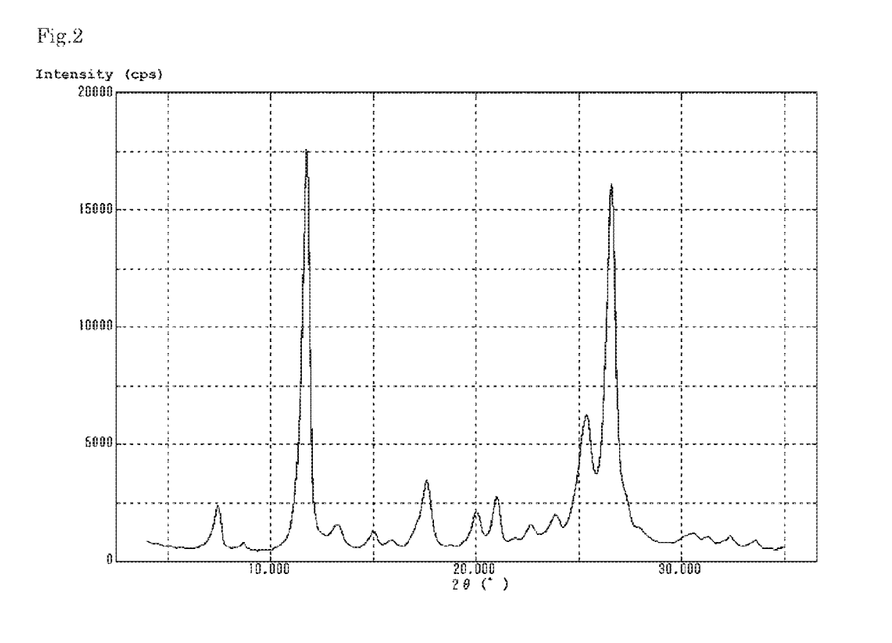
FIG. 2 is a graph showing the measurement results of powder X-ray diffraction of Pigment A prepared in Example 1.

Pigment A obtained as described above was subjected to powder X-ray diffraction by using the powder X-ray diffractometer, and the measurement results are shown in FIG. 2. The (26.6°/11.7°) diffraction intensity ratio in terms of Bragg angle (2θ±0.2°) as measured by powder X-ray diffraction was 0.94. Further, the half-value width of the peak at 11.7° was 0.39°, and the half-value width of the peak at 26.6° was 0.52°. Furthermore, Pigment A (particles) were photographed under the photographing condition of 60,000 magnification with the transmission electron microscope. The thus-photographed pigment particles were measured by visual observation. The average primary particle size of Pigment A (particles) was 85 nm. In addition, the shapes of Pigment A (particles) were relatively close to spherical, and the average of the ratios (major axes/minor axes) of their major axes to minor axes was 1.05.

Example 2

The unprocessed pigment (400 parts) prepared in the synthesis example, sodium chloride (3,600 parts) and propylene glycol (900 parts) were charged in a kneader, and the contents were kneaded into an evenly moistened mass. While maintaining the temperature of the mass at 60 to 90° C. by controlling a cooling system and a heating medium system, the mass was kneaded and milled for 6 hours to obtain a milled mixture. To the milled mixture taken out of the kneader, water (40,000 parts) was added, and the resulting mixture was allowed to stand overnight After the mixture was heated to 60° C., filtration and water washing were conducted to remove sodium chloride and propylene glycol. Subsequently, drying was conducted at 100° C. for 24 hours, followed by grinding to obtain Pigment B (385 parts).

Figure 3:
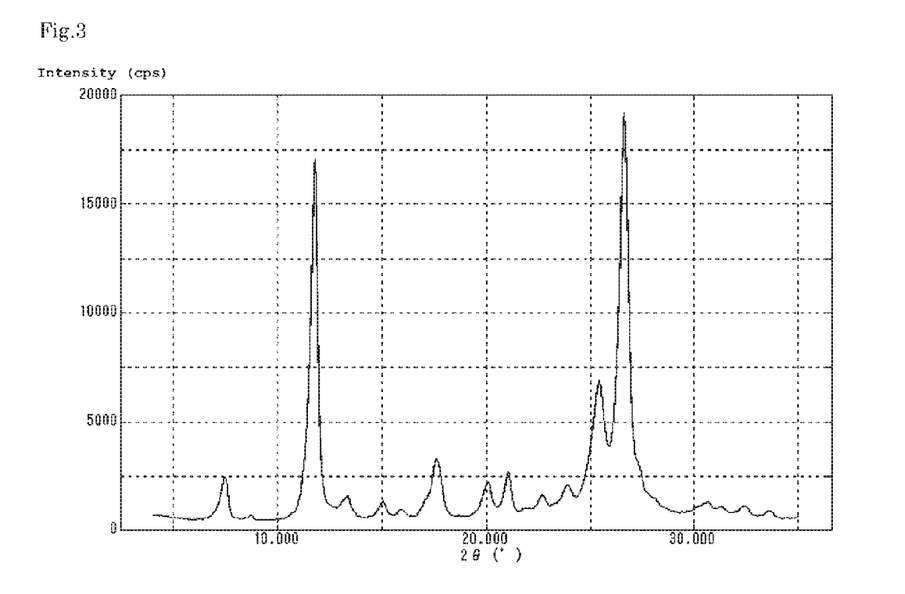
FIG. 3 is a graph showing the measurement results of powder X-ray diffraction of Pigment B prepared in Example 2.

Pigment B obtained as described above was subjected to powder X-ray diffraction by using the powder X-ray diffractometer, and the measurement results are shown in FIG. 3. The (26.6°/11.7°) diffraction intensity ratio in terms of Bragg angle (2θ±0.2°) as measured by powder X-ray diffraction was 1.12. Further, the half-value width of the peak at 11.7° was 0.40°, and the half-value width of the peak at 26.6° was 0.52°. Furthermore, Pigment B (particles) were photographed. under the photographing condition of 60,000 magnification with the transmission electron microscope. The thus-photographed pigment particles were measured by visual observation. The average primary particle size of Pigment B (particles) was 105 nm. In addition, the shapes of Pigment B (particles) were relatively close to spherical, and the average of the ratios (major axes/minor axes) of their major axes to minor axes was 1.10.

Comparative Example 1

The unprocessed pigment (400 parts) prepared in the synthesis example, sodium chloride (1,200 parts) and propylene glycol (1,000 parts) were charged in a kneader, and the contents were kneaded into an evenly moistened mass. While maintaining the temperature of the mass at 40 to 50° C. by controlling a cooling system and a heating medium system, the mass was kneaded and milled for 6 hours to obtain a milled mixture. To the milled mixture taken out of the kneader, water (40,000 parts) was added, and the resulting mixture was allowed to stand overnight. After the mixture was heated to 60° C., filtration and water washing were conducted to remove sodium chloride and propylene glycol. Subsequently, drying was conducted at 100° C. for 24 hours, followed by grinding to obtain Pigment C (385 pats).

Figure 4:
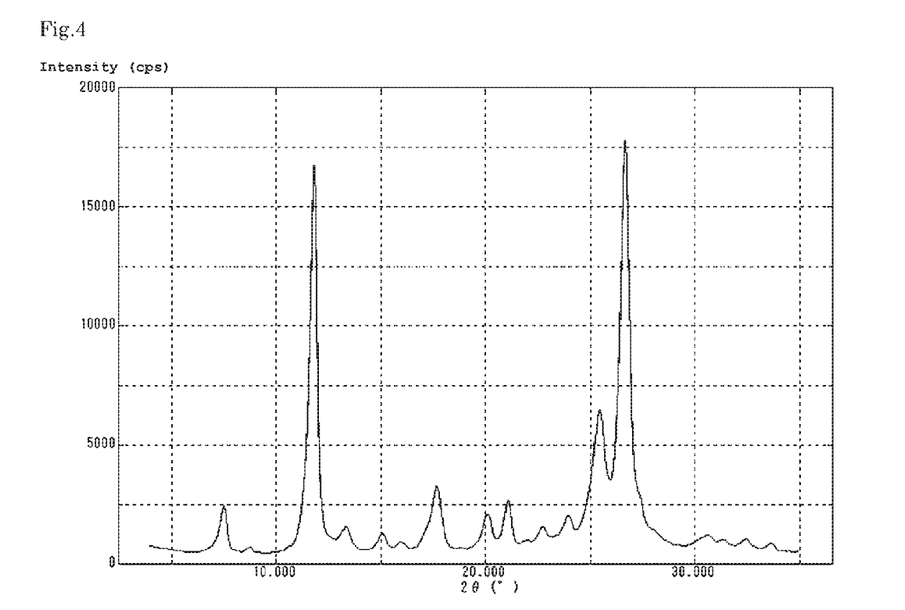
FIG. 4 is a graph showing the measurement results of powder X-ray diffraction of Pigment C prepared in Comparative Example 1.

Pigment C obtained as described above was subjected to powder X-ray diffraction by using the powder X-ray diffractometer, and the measurement results are shown in FIG. 4. The (26.6°/11.7°) diffraction intensity ratio in terms of Bragg angle (2θ±0.2°) as measured by powder X-ray diffraction was 1.05. Further, the half-value width of the peak at 11.7° was 0.40°, and the half-value width of the peak at 26.6° was 0.52°. Furthermore, Pigment C (particles) were photographed under the photographing condition of 60,000 magnification with the transmission electron microscope. The thus-photographed pigment particles were measured by visual observation. The average primary particle size of Pigment C (particles) was 135 nm. In addition, the shapes of Pigment C (particles) were relatively close to acicular, and the average of the ratios (major axes/minor axes) of their major axes to minor axes was 1.40.

Example 3

The unprocessed pigment (300 parts) prepared in the synthesis example, triethylene glycol monobutyl ether (26 parts) and zirconia beads of 3 mm diameter (6,000 parts) were charged in a ball mill, and the contents were milled into an evenly-moistened mass. The ball mill was operated at 60 rpm for 20 hours to conduct wet milling. With the addition of water (2,000 parts), the operation was continued for 10 hours, and the contents (slurry) was then taken out. The slurry so taken out was filtered, and the filter cake was washed with water. The resulting cake of crystals was dried at 90° C. for 24 hours and then ground to obtain target Pigment. D (290 parts).

Figure 5:
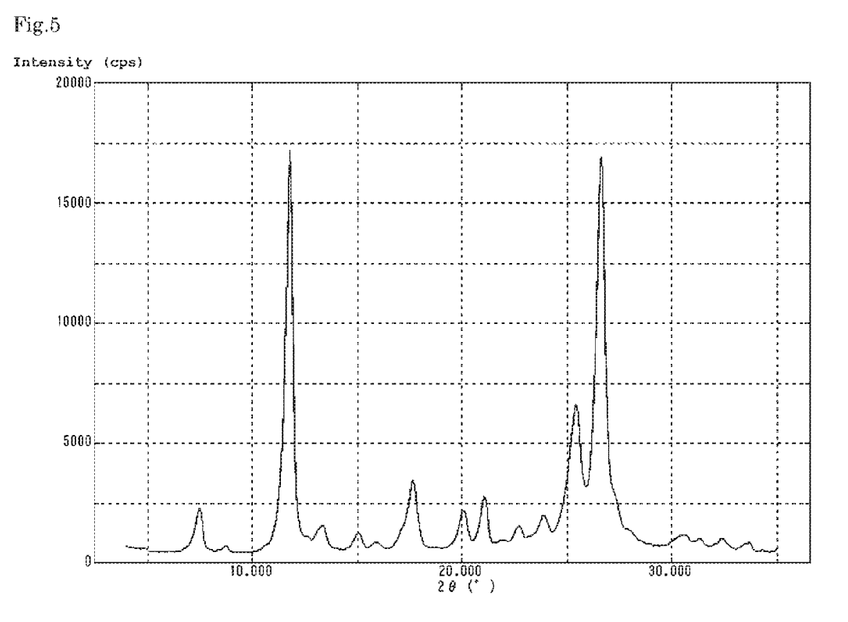
FIG. 5 is a graph showing the measurement results of powder X-ray diffraction of Pigment D prepared in Example 3.

Pigment D obtained as described above was subjected to powder X-ray diffraction by using the powder X-ray diffractometer, and the measurement results are shown in FIG. 5. The (26.6°/11.7°) diffraction intensity ratio in terms of Bragg angle (2θ±0.2°) as measured by powder X-ray diffraction was 0.98. Further, the half-value width of the peak at 11.7° was 0.40°, and the half-value width of the peak at 26.6° was 0.52°. Furthermore, Pigment D (particles) were photographed under the photographing condition of 60,000 magnification with the transmission electron microscope. The thus-photographed pigment particles were measured by visual observation. The average primary particle size of Pigment D (particles) was 110 nm. In addition, the shapes of Pigment D (particles) were relatively close to prismatic, and the average of the ratios (major axes/minor axes) of their major axes to minor axes was 1.25.

Comparative Example 2

The unprocessed pigment (300 parts) prepared in the synthesis example, N-methyl-2-pyrrolidone (39 parts) and zirconia beads of 3 mm diameter (6,000 parts) were charged in a ball mill, and the contents were milled into an evenly-moistened mass. The ball mill was operated at 60 rpm for 20 hours to conduct wet milling. With the addition of water (2,000 parts), the operation was continued for 10 hours, and the contents (slurry) was then taken out. The slurry so taken out was filtered, and the filter cake was washed with water. The resulting cake of crystals was dried at 90° C. for 24 hours and then ground to obtain target Pigment E (290 parts).

Figure 6:
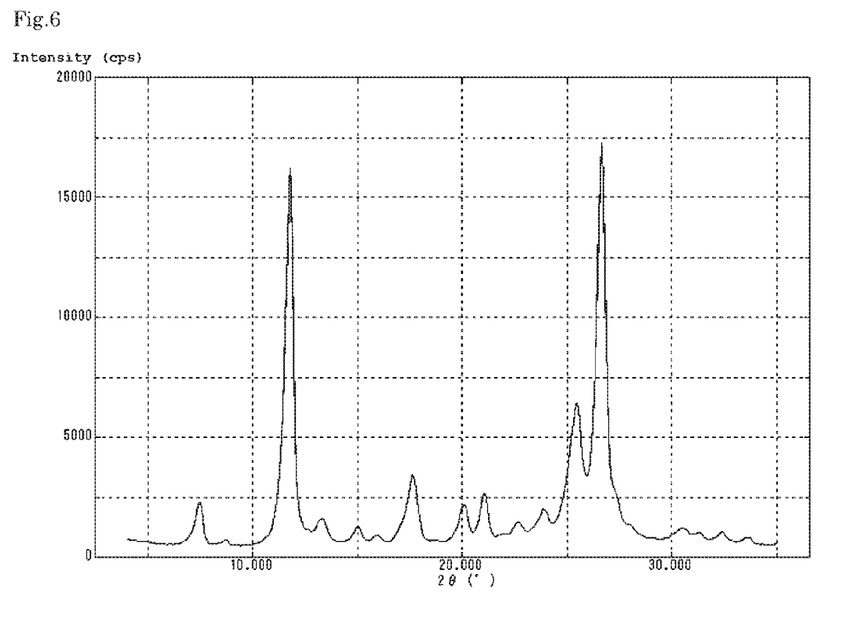
FIG. 6 is a graph showing the measurement results of powder X-ray diffraction of Pigment E prepared in Comparative Example 2.

Pigment E obtained as described above was subjected to powder X-ray diffraction by using the powder X-ray diffractometer, and the measurement results are shown in FIG. 6. The (26.6°/11.7°) diffraction intensity ratio in terms of Bragg angle (2θ±0.2°) as measured by powder X-ray diffraction was 1.08. Further, the half-value width of the peak at 11.7° was 0.41°, and the half-value width of the peak at 26.6° was 0.52°. Furthermore, Pigment E (particles) were photographed under the photographing condition of 60,000 magnification with the transmission electron microscope. The thus-photographed pigment particles were measured by visual observation. The average primary particle size of Pigment E (particles) was 150 nm. In addition, the shapes of Pigment E (particles) were relatively close to acicular, and the average of the ratios (major axes/minor axes) of their major axes to minor axes was 2.01.

Example 4

The unprocessed pigment (100 parts) prepared in the synthesis example and triethylene glycol monobutyl ether (75 parts) were placed in a beaker and were then kneaded well with a glass rod until the unprocessed pigment was thoroughly moistened, whereby a kneaded mass was obtained. The thus-obtained kneaded mass was circulated 4 times through a three-roll mill to disperse the unprocessed pigment. The dispersion product was allowed to stand overnight in water (4,000 parts) to prepare a slurry. The slurry was stirred and filtered, and the filter cake was washed with water. The resulting cake of crystals was dried at 90° C. for 24 hours and then ground to obtain target Pigment F (90 parts)

Figure 7:
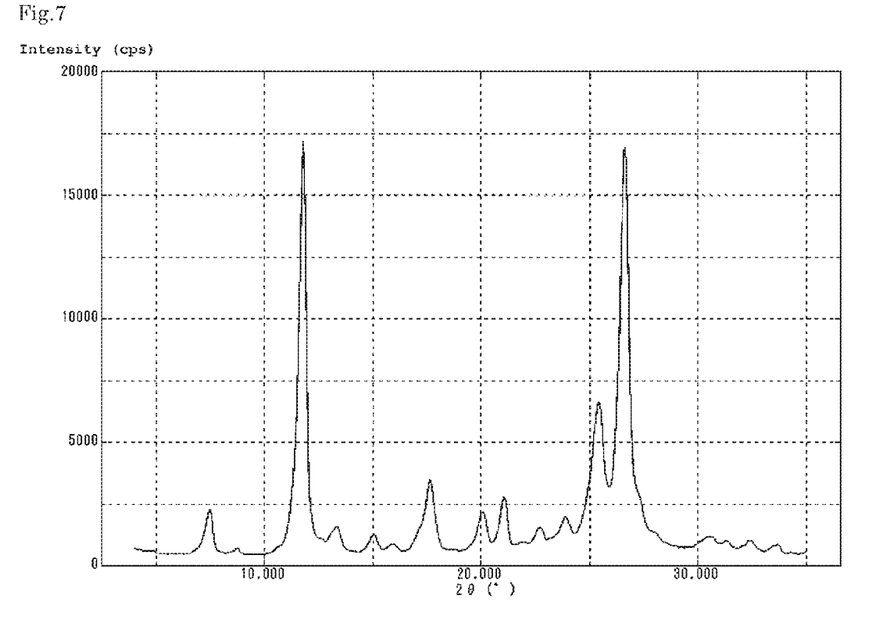
FIG. 7 is a graph showing the measurement results of powder X-ray diffraction of Pigment E prepared in Example 4.

Pigment F obtained as described above was subjected to powder X-ray diffraction by using the powder X-ray diffractometer, and the measurement results are shown in FIG. 7. The (26.6°/11.7°) diffraction. intensity ratio in terms of Bragg angle (2θ±0.2°) as measured by powder X-ray diffraction was 0.99. Further, the half-value width of the peak at 11.7° was 0.40, and the half-value width of the peak at 26.6° was 0.52°. Furthermore, Pigment F (particles) were photographed under the photographing condition of 60,000 magnification with the transmission electron microscope. The thus-photographed pigment particles were measured. by visual observation. The average primary particle size of Pigment F (particles) was 120 nm. In addition, the shapes of Pigment F (particles) were relatively close to acicular, and the average of the ratios (major axes/minor axes) of their major axes to minor axes was 1.29.

The physical property values of the pigments prepared as described above are shown together in Table 1.

TABLE 1

Properties of P.Y.74 pigments

| | | Diffraction intensity ratio | Half-value width (°) Peak at 11.7° | Half-value width (°) Peak at 26.6° | Average primary particle size (nm) | Major axis/ minor axis |
|---|---|---|---|---|---|---|
| Example 1 | Pigment A | 0.94 | 0.39 | 0.52 | 85 | 1.05 |
| Example 2 | Pigment B | 1.12 | 0.40 | 0.52 | 105 | 1.10 |
| Example 3 | Pigment D | 0.98 | 0.40 | 0.52 | 110 | 1.25 |
| Example 4 | Pigment F | 0.99 | 0.40 | 0.52 | 120 | 1.29 |
| Comp. Ex. 1 | Pigment C | 1.05 | 0.40 | 0.52 | 135 | 1.40 |
| Comp. Ex. 2 | Pigment E | 1.08 | 0.41 | 0.52 | 150 | 2.01 |

TABLE 1-continued

Properties of P.Y.74 pigments

| | | Diffraction intensity ratio | Half-value width (°) | | Average primary particle size (nm) | Major axis/ minor axis |
|---|---|---|---|---|---|---|
| | | | Peak at 11.7° | Peak at 26.6° | | |
| Synthesis Example | Unprocessed pigment | 1.20 | 0.45 | 0.52 | 160 | 2.03 |

(3) Preparation of Inkjet Inks

Example 5

To a 250-mL glass bottle with zirconia beads (120 parts) placed therein, Pigment A (10.0 parts) prepared in Example 1, a water-soluble styrene-acrylic resin (solid content 45%) (5.0 parts) and deionized water (45.0 parts) were placed, and premixing was conducted. Using a paint conditioner, the premix was subjected to dispersion processing to obtain a dispersion (60.0 parts) of pigment particles, the volume average particle sizes of which were around 110 nm. The time required for the dispersion processing was 240 minutes. It is to be noted that the above-described volume average particle sizes were measured in the course of the dispersion processing by using a laser-scattering particle size distribution analyzer ("N5 Submicron Particle Size Analyzer", trade name, manufactured by Beckman-Coulter Inc.)

The dispersion (40.0 parts) obtained as described above, triethylene glycol monobutyl ether (5.0 parts) glycerin (5.0 parts), acetylene glycol ("SURFINOL®", trade name, product of Nisshin Chemical Co., Ltd.) (0.5 parts), methanol (0.5 parts), a 10% aqueous solution of glycerylated chitosan (deacetylation degree: 80%, glyceryl substitution degree: 1.1) (8.0 parts), and deionized water (41.0 parts) were placed in a 250-mL glass bottle. After the contents were thoroughly stirred, the resulting slurry was filtered through a membrane filter (pore size : 5 μm) to remove coarse particles, whereby an inkjet ink (100.0 parts) was obtained.

Examples 6, 7 and 8, Comparative Examples 3 and 4, & Referential Example

Inkjet inks were obtained as in the above-described Example 5 except that the pigments prepared in Examples 2, 3 and 4, Comparative Examples 1 and 2 and the synthesis example were used, respectively, in place of Pigment A.

(4) Evaluation

Weather (Light) Resistance

Using a #3 bar coater, the respective inkjet inks prepared as described above were spread on commercial inkjet gloss paper sheets. After the spreading, the gloss paper sheets were left over at room temperature for 1 day. Using an accelerated weatherability tester, the gloss paper sheets were irradiated at an irradiation intensity of 100 mW/cm$^2$ (irradiation wavelength: 295 to 450 nm ultraviolet light) and room temperature for 50 hours. Using a spectrodensitometer ("500 Series", trade name, manufactured by X-rite, Inc.), reflection densities before and after the irradiation were measured. According to the below-described 5-stage standards, each inkjet ink was evaluated for weather (light) resistance. The results are shown in Table 2.

Evaluation Standards
  5: reflection density≥85%
  4: 85% >reflection density≥70%
  3: 70% >reflection density≥55%
  2: 55% >reflection density≥40%
  1: 40% >reflection density Particle Size Stability The respective inkjet inks prepared as described above were allowed to stand at 25° C. for 1 hour. Using a similar laser-scattering particle size distribution analyzer as that used above, the volume average particle size (initial dispersion particle size, Φ1) of the pigment in each inkjet ink was measured. After the inkjet ink was maintained at 50° C. for 10 days, the volume average particle size (dispersion particle size with time, Φ2) of the pigment in the inkjet ink was then measured. The ratio (Φ2/Φ1) of the dispersion particle size with time, Φ2, to the initial dispersion particle size, Φ1, was then calculated. According to the below-described 5-stage standards, each ink was evaluated for particle size stability The results are shown together in Table 2.

Evaluation Standards
  5: Φ2/Φ1≤1.3
  4: 1.3<Φ2/Φ1≤1.5
  3: 1.5<Φ2/Φ1≤1.7
  2: 1.7<Φ2/Φ1≤1.9
  1: 1.9<Φ2/Φ1

Storage Stability

The respective inkjet inks prepared as described above were allowed to stand at 25° C. for 1 hour. Using an E-type viscometer ("RE80 Model", trade name, manufactured by Tokyo Industry Co., Ltd.; value at 50 rpm), the viscosity (initial viscosity, η1) of each inkjet ink was measured. After the inkjet ink was maintained at 50° C. for 10 days, the viscosity (viscosity with time, η2) of the inkjet ink was then measured in a similar manner as described above. The ratio (η2/η1) of the viscosity with time, η2, to the initial viscosity, η1, was then calculated. According to the below-described 5-stage standards, each ink was evaluated for storage stability. The results are shown together in Table 2.

Evaluation Standards
  5: η2/η1≤1.1
  4: 1.1<η2/η1≤1.3
  3: 1.3<η2/η1≤1.5
  2: 1.5<η2/η1≤1.7
  1: 1.7<η2/η1

Clarity

Separately using the respective inkjet inks prepared as described above, images were printed by an on-demand inkjet printer equipped with piezoelectric oscillators. Each image so obtained was visually observed, and according to the below-described standards, was evaluated for clarity. The results are shown together in Table 2.

Evaluation Standards
  A: good
  B: practical level
  C: unclear

Transparency

Using a #3 bar coater, the respective inkjet inks prepared as described above were spread on commercial inkjet OHP films. After the spreading, the films were visually observed, and according to the below-described standards, the respective images were evaluated for transparency. The results are shown together in Table 2.

Evaluation standards
  A: good
  B: opaque
  C: not transparent

TABLE 2

Inkjet Inks

| | Kind of pigment | Evaluation results | | | | |
|---|---|---|---|---|---|---|
| | | Weather (light) resistance | Particle size stability | Storage stability | Clarity | Transparency |
| Example 5 | Pigment A | 5 | 5 | 5 | A | A |
| Example 6 | Pigment B | 4 | 5 | 5 | A | A |
| Example 7 | Pigment D | 4 | 4 | 5 | A | A |
| Example 8 | Pigment F | 4 | 4 | 5 | B | A |
| Comp. Ex. 3 | Pigment C | 3 | 3 | 4 | B | A |
| Comp. Ex. 4 | Pigment E | 2 | 3 | 4 | C | B |
| Synthesis Example | Unprocessed pigment | 1 | 2 | 2 | C | C |

INDUSTRIAL APPLICABILITY

The use of P.Y. 74 (insoluble azo pigment) according to the present invention enables to provide a coloring composition, which is good in particle size stability and storage stability and can form (record) images of excellent clarity and transparency. The coloring composition according to the present invention is useful and expected to find utility, for example, as various printing inks, sizing colors, binder colors, coating formulations, various paints, dry or wet toners for electrophotography, thermal transfer recording inks, inks for writing utensils, coating formulations for forming color filter pixels, inkjet inks, and the like.

The invention claimed is:

1. A C.I. Pigment Yellow 74 as a water-insoluble azo pigment,
wherein the C.I. Pigment Yellow 74 is in a form of crystalline particles,
the crystalline particles of the C.I. Pigment Yellow 74 have a ratio (26.6°/11.7°) of a diffraction intensity of a peak at 26.6° to a diffraction intensity of a peak at 11.7° in terms of Bragg angle (2θ±0.2°) in a range from 0.85 to 0.99, as measured by powder X-ray diffraction using CuK α-radiation,
the crystalline particles have an average primary particle size in a range from 20 to 130 nm,
the crystalline particles have an average value of length ratios (major axes/minor axes) of major axes to minor axes of the crystalline particles in a range from 1.00 to 1.50, and
an inkjet ink image of an inkjet ink comprising the C.I. Pigment Yellow 74 has weather resistance in a range of 70% or more of a reflection density ratio of a reflection density of the inkjet ink image after irradiation of UV light relative to a reflection density of the inkjet image before the irradiation,
wherein the inkjet ink image is prepared by spreading an inkjet ink comprising the C.I. Pigment Yellow 74 on an inkjet gloss paper sheet,
the UV light irradiation is performed by irradiating UV light at a wavelength in a range from 295 nm to 450 nm at an irradiation intensity of 100 mW/cm$^2$ for 50 hours at room temperature, and
the reflection density is measured with a spectrodensitometer.

2. The C.I. Pigment Yellow 74 according to claim 1, wherein a half-value width of the peak at 11.7° and a half-value width of the peak at 26.6° are both in a range from 0.10 to 0.60°.

3. A coloring composition comprising, as a colorant, the C.I. Pigment Yellow 74 according to claim 1.

4. The coloring composition according to claim 3, which is an image recording composition or an inkjet recording composition.

* * * * *